July 13, 1965  C. R. ZIMMERMAN  3,194,323
ADJUSTABLE SPRING REGULATOR FOR FURROW OPENERS
Filed Sept. 16, 1963
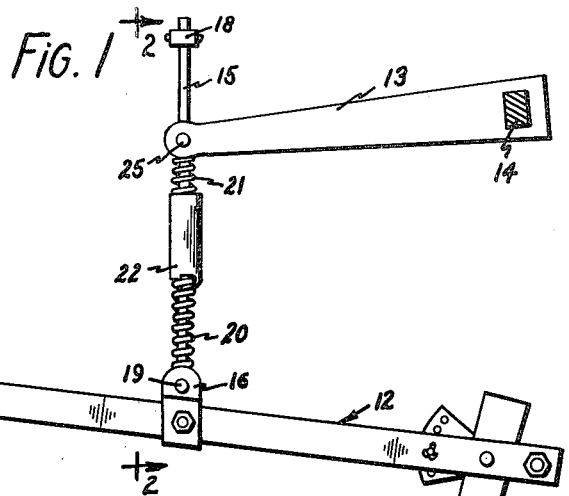
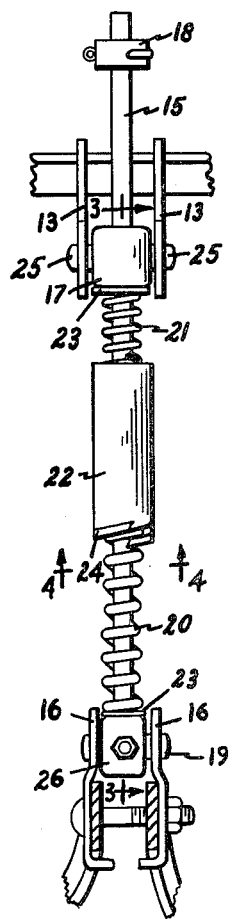
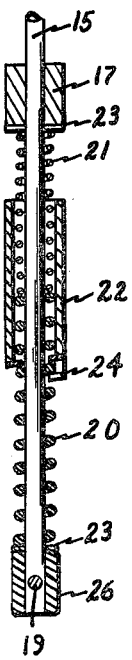
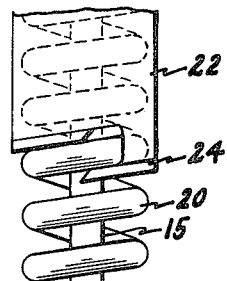
INVENTOR.
CLARENCE ROBERT ZIMMERMAN
BY
Wells & St. John
ATTYS.

United States Patent Office 3,194,323
Patented July 13, 1965

3,194,323
ADJUSTABLE SPRING REGULATOR FOR
FURROW OPENERS
Clarence Robert Zimmerman, Box 6, Almira, Wash.
Filed Sept. 16, 1963, Ser. No. 309,070
4 Claims. (Cl. 172—500)

This invention relates to a novel depth regulator for furrow openers such as are used on grain drills and other planting equipment.

The invention described below is concerned with the accurate regulation of the planting depth attained by furrow openers in grain drills and similar equipment. Present equipment varies in planting depth depending upon the type of soil encountered and the ground contour. The equipment available to date works only with moderate success where the ground surface is not perfectly level. The device described below is adapted to be used on existing planting equipment, and is designed to provide more accurate regulation of the planting depth, plus additional resistance to vertical movement of the furrow due to ground resistance, while retaining the possibility of clearance in order to avoid immovable obstacles such as rocks.

It is a first object of this invention to provide a simple depth regulator which is readily adaptable to existing equipment requirements. In fact, the present invention merely replaces a spring found on present drills and requires no mechanical changes in the linkages that support the usual furrow openers.

Another object of this invention is to provide a depth regulator that can be readily adjusted to limit the amount of movement allowable in the furrow opener in order to adjust to changing ground contour.

These and further objects will be evident from a study of the specific description of one embodiment of the invention set out below and illustrated in the accompanying drawings. It is to be emphasized at the offset that the details of this illustrated example are not intended to restrict or limit the scope of the invention, which is set out in the claims that follow the specification.

In the drawings:

FIGURE 1 is an elevation view of a single furrow opener assembly, illustrating only those elements of the assembly with which the instant device is concerned;

FIGURE 2 is an enlarged view of the assembly as seen along line 2—2 in FIGURE 1;

FIGURE 3 is a sectional view through the depth regulator as seen along line 3—3 in FIGURE 2;

FIGURE 4 is a sectional view on an enlarged scale showing the depth regulator as seen along line 4—4 in FIGURE 2; and FIGURE 5 is an enlarged fragmentary view of the device showing the gripping of the spring.

This invention relates to an improved device to insure proper depth regulation of a furrow opener or similar device on a drill or other type of planting mechanism used in the sowing of crops. It is a well known difficulty with conventional devices that the furrow opener is subject to depth variations due to the different ground contours encountered and due to changing soil density, such as when encountering layers of clay or dried soil. The present invention substitutes in place of the normal pressure spring a device capable of producing increased yieldable resistance to movement of the furrow opener so as to limit the amount of motion available to the furrow opener at a particular planting depth.

Referring to the drawings, the normal type of furrow opener mounting is shown in its essential parts in Figuures 1 and 2. This mounting apparatus is carried upon a forward frame member 10 having frame clips 11 protruding rearwardly therefrom upon which are pivotally mounted the furrow openers generally designated by the numeral 12. It is to be understood that any type of furrow opener such as a plow, a plow plus a seed trench blade, a disc type opener or a simple hollow tube may be used to both place seed and form a furrow.

In order to produce a downward or upward force on the furrow opener 12, it is conventional to use a pressure arm 13 pivotally mounted upon a shaft 14 so that as the shaft 14 is rotated the pressure arm 13 will also be rotated about the axis of shaft 14. Located intermediate the pressure arm 13 and the furrow opener 12 is a pressure spring rod 15 that assumes a substantially vertical position in most instances. The rod 15 is pivotally connected at its lower end to a clip 16 on the furrow opener 12 for rotation about the axis of a mounting shaft 19. Rod 15 is slidably carried within a bearing 17 that in turn is pivotally connected to the pressure arm 13 for rotation about the axis of mounting shafts 25. Fixed to the top end of the pressure spring rod 15 is a conventional limit stop 18.

In a conventional apparatus, a simple compression spring is mounted between the bearing 17 and the furrow opener 12 about the pressure spring rod 15. Adequate pressure is then applied to the spring as required to force the furrow opener downwardly into the soil to the desired depth. The stop 18 is used to lift the furrow from soil engagement for travel purposes and to apply suction pressure to the openers. In order to provide adequate pressure adjustment, the strength of the spring must be such that the furrow opener can yield upwardly due to various changes in the resistance to penetration of the soil being worked. The single spring is incapable of allowing proper depth adjustment to accommodate for changes in soil contour, and therefore seed is planted over a wide range of depths in a single pass of a machine over a field.

According to the present invention, the normal single spring is replaced by a pair of springs 20 and 21 mounted in back to back relationship along the rod 15. The coaxial springs 20 and 21 abut each other and respectively abut washers 23 located adjacent to the lower end of the bearings 17 and the upper end of the mounting bracket 26 fixed to the lower end of the spring rod 15. The lower spring 20 has a higher spring constant than that of the upper spring 21, and therefore is capable of providing greater resistance to movement of the furrow opener 12 than that provided by the lighter spring 21.

Mounted coaxially about the junction of springs 20 and 21 is a collar 22 that extends longitudinally parallel to the rod 15. This collar 22 of tubular rigid metal is provided at its lower end with a lock washer 24 fixed thereto at such an angle as to frictionally and threadably engage the spring 20. The threadable engagement of the collar 22 with the spring 20 could be provided in many different ways, such as by machined threads on the interior of the collar 22 or by a separate bracket fixed thereto. It has been found best to provide threadable engagement of only a single coil of the spring 20 so that the normal spring action of the remainder of the spring will be unimpaired. It is important that a tight frictional fit be provided at the area of threadable engagement of collar 22 with spring 20, so that the position of the collar 22 will not be altered during use by vibration. The washer 24 provides a simple threadable grip only along its overlapping areas (FIGURE 5). It appears evident that other means of fixing the position of the collar 22 relative to spring 20 could be employed if so desired, such as a set screw that could positively lock collar 22 in the desired position relative to spring 20.

The collar 22 serves as a means to limit the amount of compression of the weaker spring 21 due to changes in the ability of the furrow opener 12 to penetrate the soil. This amount of motion can be set at whatever limit is desired, such as 1 inch or ½ inch.

This limit is then provided by the collar 22 without eliminating the ability of the furrow opener 12 to move upwardly by compression of the heavier spring 20 in order to clear immoveable obstacles such as rocks. It is to be noted that the amount of pressure exerted by the opener 12 to move the rod 15 above the limit of motion available due to the lighter spring 21 is considerably greater than that conventionally available with a single spring. Thus the furrow opener 12 will remain at a more constant elevation relative to the ground contour, and will rise and fall in the ground surface to maintain a more constant planting depth. The furrow opener 12 will follow small rises and falls in the ground surface, but will not deviate substantially from the normal planting depth unless a rock or other unpenetrable object is encountered. By selectively choosing the placement of the collar 22 relative to the springs 20 and 21, the relative movement available to the furrow opener 12 can be limited to meet particular planting requirements.

In order to use this device, the mounting shaft 14 is rotated, thereby rotating the pressure arms 13, to the position at which the furrow openers 12, attain the desired depth in the ground. When this has been reached, the collar 22 is then rotated relative to the springs 20 and 21 through a distance short of contact with the upper washer 23 equal to the desired limit in the variance of planting depth. As the drill or planting device is drawn over the field, the spring 21 will allow the furrow opener 12 to rise and fall with ground contour, but not beyond the limit set by collar 22. Should the ground become more difficult to penetrate, the heavier spring 20 will prevent the raising of the furrow opener 12 or will at least minimize this movement. Thus the furrow opener 12 will be maintained at the desired depth even in harder soils. The ability of the furrow opener 12 to lower itself when striking a soft spot is unimpaired. The party using the device has complete control over the amount of rise and fall available to the furrow opener in order to accommodate for field conditions and changes in contour.

In the specific arrangement shown in the drawings, the springs 20 and 21 are separate springs and are not joined to one another. This has been found to be the most practical method of fabricating this device. It is also possible that the springs 20 and 21 might be joined to one another at their abutting ends so as to provide a single unit having two areas of different spring constants.

Various modifications might be necessary in order to accommodate this device to a particular planting mechanism and all such equivalent changes are intended to be incorporated in the above disclosure.

Having thus described my invention, I claim:

1. A depth regulator for a furrow opener movably mounted on a supporting framework and having a pressure spring rod pivotally connected thereto and slidably engaged within a pressure arm also movable mounted on the framework, comprising:
   first coiled spring means mounted coaxially about the pressure spring rod in abutment with said furrow opener and extending along said pressure spring rod in the direction of its engagement by the pressure arm;
   second coiled spring means mounted coaxially about the pressure spring rod in engagement with said first coiled spring means and said pressure arm, the spring constant of one of said spring means being greater than that of the remaining spring means;
   and a coaxial collar threadably engaged with said one of said spring means for longitudinal adjustment relative thereto, said collar extending longitudinally along a portion of the remaining one of said spring means to selectively limit the amount of compression of said remaining one of said spring means prior to compression of said one of said spring means alone.

2. A depth regulator for a furrow opener movably mounted on a supporting framework and having a pressure spring rod pivotally connected thereto and slidably engaged within a pressure arm also movably mounted on the framework, comprising:
   a first compression spring mounted coaxially about the pressure spring rod in abutment with said furrow opener and extending partially along the length of the rod when in a relaxed state;
   a second compression spring mounted coaxially about the pressure spring rod in abutment with the pressure arm and said first spring, one of said springs having a greater spring constant than that of the remaining spring;
   and a collar mounted coaxially about the abutting portions of said first and second springs in an overlapping relationship relative thereto having a longitudinal dimension less than the normal separation of the pressure arm and furrow opener along the pressure spring rod, said collar being engaged with said one of said springs for longitudinal adjustment relative thereto, to selectively limit the amount of compression of the remaining one of said springs prior to compression of said one of said springs alone.

3. A depth regulator as defined in claim 2 wherein said collar is frictionally engaged with no more than one complete coil of the spring engaged thereby.

4. A depth regulator for a furrow opener movably mounted on a supporting framework and having a pressure spring rod pivotally connected thereto and slidably engaged within a pressure arm also movably mounted on the framework, comprising:
   a first coiled compression spring mounted coaxially about the pressure spring rod intermediate the furrow opener and pressure arm;
   a second coiled compression spring mounted coaxially about the pressure spring rod intermediate the furrow opener and pressure arm in abutment with one end of said first spring, the spring constant of said second spring being less than that of said first spring;
   and a collar mounted for longitudinal adjustment coaxially about said first and second coiled springs adjacent said one end of said first spring in threadable engagement with said first spring to selectively limit the amount of compression of said second spring prior to compression of said first spring alone.

References Cited by the Examiner

UNITED STATES PATENTS

| | | | | |
|---|---|---|---|---|
| 753,452 | 3/04 | Van Brunt | | 172—500 |
| 945,098 | 1/10 | Kearin | | 172—500 |

T. GRAHAM CRAVER, *Primary Examiner.*

ANTONIO F. GUIDA, *Examiner.*